UNITED STATES PATENT OFFICE.

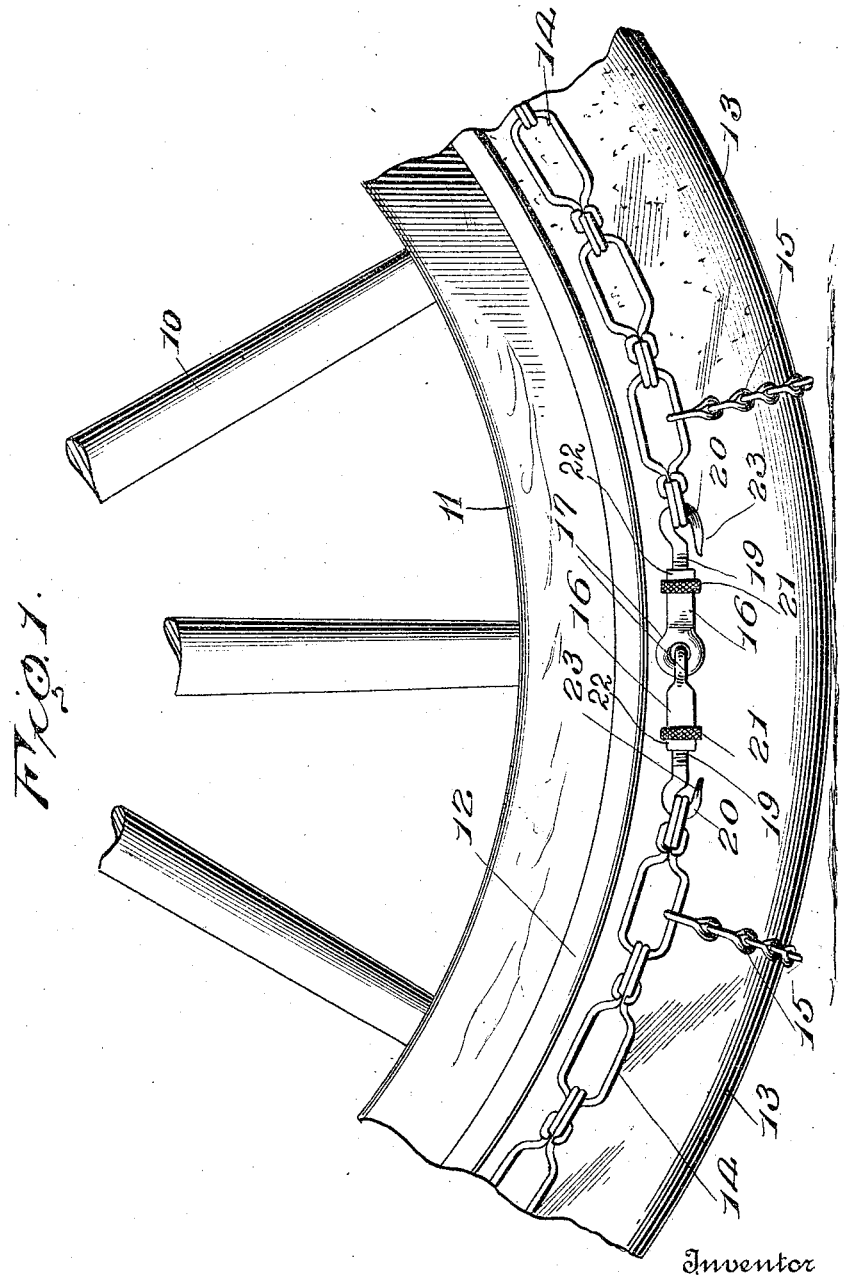

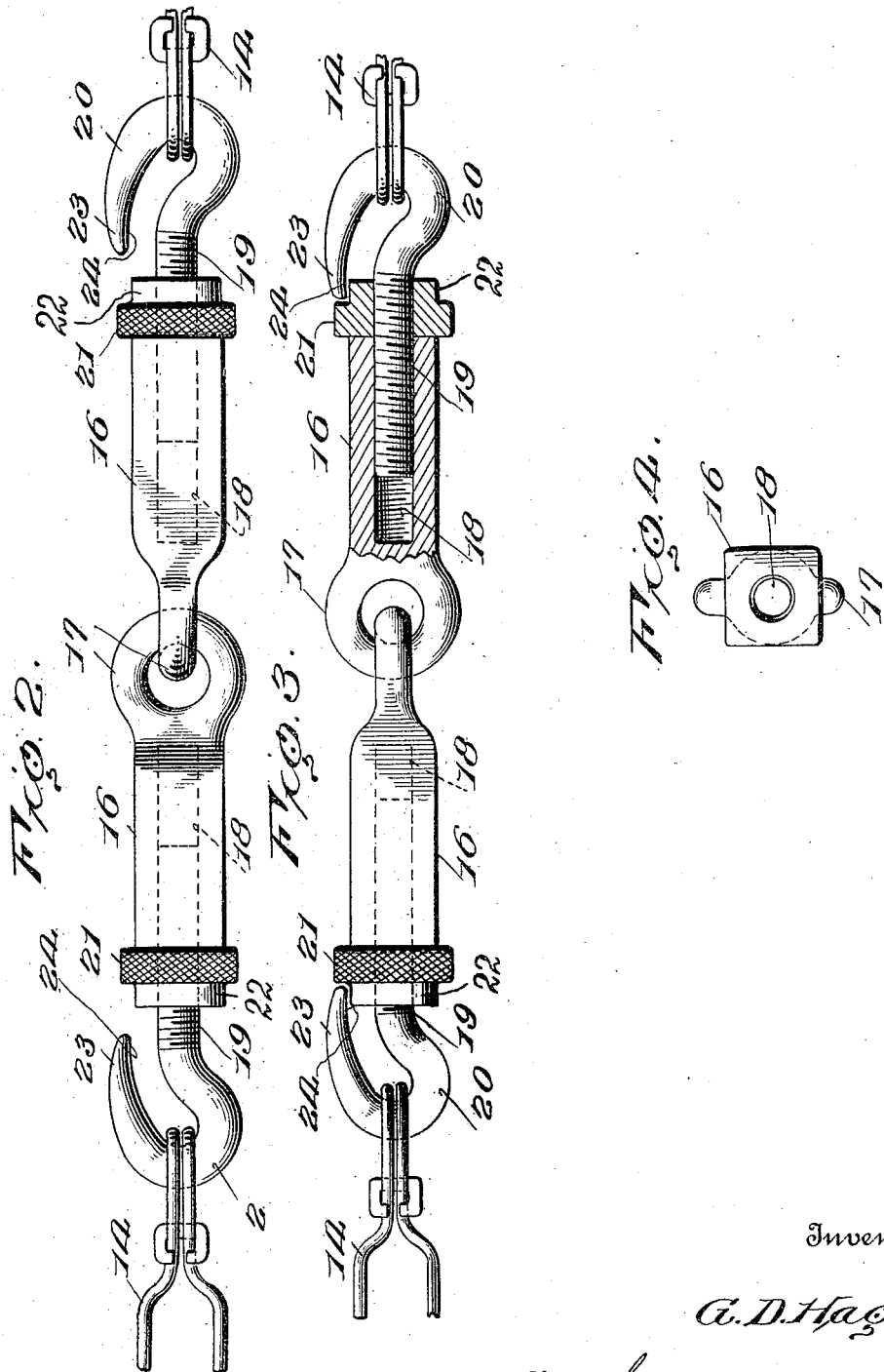

GEORGE D. HAGAR, OF ALTON, IOWA.

GRIP-CHAIN COUPLING.

1,295,738.   Specification of Letters Patent.   Patented Feb. 25, 1919.

Application filed June 1, 1918. Serial No. 237,782.

*To all whom it may concern:*

Be it known that I, GEORGE D. HAGAR, a citizen of the United States, residing at Alton, in the county of Sioux and State of Iowa, have invented certain new and useful Improvements in Grip-Chain Couplings, of which the following is a specification.

This invention relates to couplings for grip chains of automobile and other vehicle wheels, and has for one of its objects to provide a simply constructed device which may be coupled between the confronting ends of the side chains and adjusted longitudinally to adapt the chains to wheels of varying sizes, and which may also be employed to replace broken or impaired links in the chains.

Another object of the invention is to provide a device of this character whereby strain may be applied to the coupled portions of the chain by simply rotating the body portions of the couplings.

Another object of the invention is to provide a coupling of this character which may be manufactured in quantities for the trade and applied by any person without previous skill or knowledge.

With these and other objects in view, the invention consists in certain novel features of construction, as hereinafter shown and described and then specifically pointed out in the claims; and in the drawings illustrative of the preferred embodiment of the invention—

Figure 1 is a side elevation of a portion of an automobile wheel including a portion of one of the side chains and a plurality of the cross chains, with the improvement applied, Fig. 2 is an enlarged side elevation of the improved device with the combined hook closing and jamb nut devices in released position, Fig. 3 is a view similar to Fig. 2, partly in section, with the parts in closed and strained position, Fig. 4 is an end elevation of one of the units of the improved device.

The grip chains of the vehicle wheels generally comprise endless portions applied to the sides of the tires and connected at intervals by shorter sections of chains passing over the outer face of the tire. At one point the side chains are usually provided with means for coupling their terminals. The principal object of the present invention is to provide a simply constructed coupling device having means whereby the confronting terminals of the chains may be locked together and prevented from becoming loosened or displaced under the severe strains to which they are subjected when in use. The improved device is adjustable longitudinally to enable the necessary strain to be applied to the side chains and likewise to adapt the chains to wheels of varying sizes. The coupling is designed to not only apply the requisite strain to the side chains but likewise to provide a substitute for broken or impaired links.

In the drawings the spokes of the wheel are represented at 10, the felly at 11, the rim at 12 and the pneumatic tire casing at 13, these parts being of the usual construction. A portion of one of the side chains is represented as a whole at 14 and a pair of the cross chains at 15. The connecting device comprises body portions 16 coupled at their confronting ends by eyes 17, so that the members 16 are flexibly coupled and free to swing relative to each other in all directions. The body portions 16 are preferably square or of other form than round to receive a turning implement such as a wrench or the like, and each is provided with an internally threaded socket 18 opening at the end opposite to the eye, the threads being right and left, as shown. Engaging in each socket is a threaded bar 19 terminating in an open eye or hook 20 with which the adjacent link of the side chain is connected, as shown. The threads of the bars are also right and left to correspond to the threads of the sockets. A combined jam nut and hook closure 21 is engaged with each threaded bar 19 and each nut 21 is adapted to bear by one face against the end of the adjacent body member 16, when in one position.

Extending from each nut 21 is a collar or sleeve 22 and the "bill" portion 23 of each of hook 20 is formed with an inner flat face 24 adapted to bear over the adjacent collar 22 when the nut 21 is rotated toward the hook, as shown in Fig. 3.

The terminal links of the side chains will be initially spaced a distance greater than the distance between the confronting ends of the bars when the latter are disposed at the greatest distance apart, and then after the hooks are coupled and the jam nuts are rotated to cause the collars to close the hooks, the members 16 are forcibly rotated by a wrench or other implement to cause the bars 19 to be drawn toward each other by the coaction of the right and left threads until their outer ends bear against the jam nuts, as shown in Fig. 3. The bars 19 are thus locked in position after the adjustment has been made, and displacement prevented.

By this means an efficient adjustable coupling and straining device is provided whereby the confronting ends of the side chains may be adjustably connected, or the device substituted for a broken or impaired link.

The coupling may likewise be employed, if required, in connection with the cross chains 15.

The improved device is simple in construction, can be inexpensively manufactured and sold to the trade for application by the individual automobile owners.

Having thus described the invention, what is claimed as new is:

1. A device of the class described comprising coacting body portions movably coupled at their confronting ends and with right and left threaded sockets opening respectively through the outer ends, longitudinally adjustable rods right and left threaded engaging the threads of the sockets, and having open hooks adapted to be coupled to the confronting ends of a chain, and threaded holding members engaging the rods and adapted to close the hooks, said socketed bodies being adapted to bear against the threaded holding members when reversely rotated to lock them in position closing said hooks.

2. A device of the class described comprising coacting body portions movably coupled at their confronting ends and with right and left threaded sockets opening respectively through the outer ends, longitudinally adjustable rods right and left threaded engaging the threads of the sockets and having open hooks adapted to be coupled to the confronting ends of a chain, and a threaded holding member engaging each rod, and each formed with a collar adapted to enter the throat of the adjacent hook and close the same, said socketed bodies being adapted to bear against the threaded holding members when reversely rotated to lock them in position closing said hooks.

3. A device of the class described comprising pivotally connected bodies each having a threaded socket formed therein and opening through the outer end thereof, bars threaded in said sockets and provided with terminal hooks for engagement with a chain, clamping nuts threaded on the bars and movable into engagement with the bills of the hooks to close said hooks, said bodies being adjustable longitudinally relative to the threaded bars whereby to cause the hooks to exert a longitudinal pull on the chains.

4. A device of the class described comprising pivotally connected bodies each having a threaded socket formed therein and opening through one end thereof, threaded bars engaging the threads of the sockets and provided with terminal hooks for engagement with a chain, nuts threaded on the bar and having their outer faces cut-away to form annular shoulders movable into engagement with the bills of hooks to close the same, said bodies when rotated serving to draw the bars together and place the chains under tension and cause the nuts to bear against the adjacent outer ends of said bodies.

In testimony whereof I affix my signature.

GEORGE D. HAGAR. [L. S.]

Copies of this patent may be obtained for five cents each, by addressing the "Commissioner of Patents, Washington, D. C."